Patented Aug. 14, 1951

2,564,404

UNITED STATES PATENT OFFICE 2,564,404

CRACK-RESISTANT RUBBER AND METHOD FOR PRODUCING THE SAME

Frank M. McMillan and David E. Adelson, Berkeley, Calif., assignors to Shell Development Company, San Francisco, Calif., a corporation of Delaware No Drawing. Application September 24, 1948, Serial No. 51,116

10 Claims. (Cl. 260—810)

This invention relates to the compounding of rubbery polymer, and it is particularly directed to the provision of vulcanized rubbery polymer products having improved resistance against atmospheric cracking of the type believed attributable to ozone attack.

The term "rubbery polymer," as employed herein, is intended to embrace both natural rubber in its various forms, including latex, crepe, smoked and unsmoked sheet, Caoutchouc, gutta percha, balata and cyclo rubbers, as well as those synthetic rubbery polymers having a generally straight-chain structure which are derived from conjugate diolefins and can be vulcanized with sulfur to produce materials of a rubber-like nature. Included within the term are such synthetic rubbers as butadiene polymer and the polymers of the methyl substituted dienes; copolymers of one butadiene with a different butadiene compound, as the copolymer of butadiene with natural rubber; interpolymers of a butadiene compound, e. g., butadiene itself, with other polymerizable compounds such as acrylic and methacrylic acids and their esters, or with di-vinyl benzene, styrene (Buna S, Chemigum IV, Hycar O. S.) or ethylenic hydrocarbons (Butyl Rubber) such as ethylene, butylene, isobutylene and propylene, or with nitrogen-containing compounds such as acrylic and methacrylic acid nitriles, or with vinyls such as vinyl chloride, vinyl alcohol, vinylidene chloride, vinyl acetate, vinyl ketone and vinyl aldehyde, or with such other compounds as terpenes, paraffinic compounds, oils, resins, etc.

The above-defined materials, including both natural as well as the indicated classes of synthetic rubbers, may be broadly defined as "sulfur-vulcanizable, rubbery polymers of at least one conjugated diolefin compound."

The various rubbery polymers (natural and synthetic) described above are susceptible, in greater or lesser degree, to surface cracking on exposure to the atmosphere coupled with even the slightest degree of flexing. This phenomenon, variously described as "sun checking," "light checking," "weather checking," "surface cracking,"."ozone cracking" and "atmospheric cracking," is believed attributable in large part to an attack on the rubber by ozone present in the atmosphere, an attack which takes place in either the presence or absence of light. This condition, which will here be generally referred to as "atmospheric cracking," should not be confused with cracking induced by repeated flexing of the rubber in the absence of ozone, nor is it related to the crazing incident to a break-up of the brittle surface layer which forms on the surface of vulcanized rubber materials exposed to light and oxygen. Both flex-cracking as well as crazing may be retarded or even prevented altogether in a known manner by the use of suitable compounding ingredients, principally anti-oxidants, but this is not the case with atmospheric cracking. The best remedy for the latter type of deterioration is to incorporate one or more waxes in the rubber mix which later bloom to the surface of the vulcanized article and cover it with a thin protective film. However, this method is impractical for use with tires and similar objects which are flexed during use, for here the protective wax film is rapidly broken up, with the result that atmospheric cracking quickly ensues and is, in fact, aggravated by the presence of the wax.

It is an object of this invention to provide a method for increasing the resistance of vulcanized rubbery polymer materials against atmospheric cracking. A more particular object is to provide a method of this nature which is not dependent on the establishment and maintenance of a film, but which acts to inhibit ozone attack and is therefore effective under both static as well as dynamic conditions. A further object is to provide a compounding ingredient for use in rubbery polymer mixtures to be vulcanized which will inhibit ozone attack on the vulcanized product without otherwise modifying the properties of the vulcanized product. Still another object of the invention is to provide vulcanized rubbery polymer compositions which will remain substantially free of atmospheric cracking under all conditions of use. The nature of these as well as the other objects of the invention will become fully apparent on a consideration of the following description.

It is our discovery that these and other objects are achieved by incorporating with the rubbery polymer, prior to vulcanizing the same, a minor amount of reaction product of a higher ketone with a sulfide selected from the group consisting of the phosphorus sulfides and a complex containing ammonium hydrosulfide and hydrogen sulfide. The latter material, which will be generally referred to hereinafter as "ammonium hydrosulfide-hydrogen sulfide," is preferably formed by first saturating a suitable solvent liquid with anhydrous ammonia and then with hydrogen sulfide, the hydrogen sulfide always being present in excess over the amount required to convert the ammonium into ammonium hydrosulfide. In other respects, the mix to be vulcanized is compounded in the normal fashion, and the resulting vulcanized product is unchanged in its physical properties except for an increased resistance against atmospheric cracking imparted by the ketone-sulfide reaction product.

The term "higher ketone" is employed herein to designate those ketones containing at least 12, and preferably 15 or more, carbon atoms in the molecule. Such ketones are preferably of the mono-carbonyl variety, contain the ketonic carbonyl group as the only reactive group, and are of the type obtained from the catalytic condensation of acetone either with itself or with compounds condensable therewith to form higher ketones, an example of such compounds being the lower alcohols such as isopropyl, isobutyl, and isoamyl alcohols. Among the higher ketones so obtained, any one or more of which are satisfactory for use in the present invention, are those which are saturated or unsaturated, and acyclic or alicyclic in character. Thus, representative higher ketones may be prepared by condensing acetone in the presence of strong (30% to 60%) caustic at temperatures ranging from 130° C. to 170° C. and at pressures of from 300 to 500 p. s. i., for example. Under favorable circumstances this condensation is productive, in the main, of isophorone, though at the same time various $C_{12}$ and higher unsaturated ketones are produced which remain as bottoms after the isophorone and the other lower boiling constituents have been distilled off. Such bottoms, termed "crude isophorone bottoms," may either be used as such in the formation of the sulfide reaction products hereinafter described, or they may be fractionally distilled into various components which may be used individually or in combination. The $C_{12}$ fraction ($C_{12}H_{18}O$) boils within the range of approximately 112° C. to 123° C. (10 mm. Hg), a mixture of $C_{12}$ and $C_{15}$ ($C_{15}H_{22}O$) ketones boils from about 123° C. to about 142° C. (10 mm. Hg), whereas the $C_{15}$ ketones themselves boil within the range of about 140° C. to 175° C. (10 mm. Hg). A preferred mixture of unsaturated ketones, termed "topped, crude, isophorone bottoms" is that which remains in the still when crude isophorone bottoms are distilled until a still head temperature of approximately 140° C. (10 mm. Hg) is reached, the residue comprising, in the main, $C_{15}$ and higher unsaturated ketones.

Crude isophorone bottoms of the type described above may also be subjected to hydrolysis with dilute caustic after which the bottoms are separated from the acetone and isophorone formed during the hydrolysis step. The bottoms, which can then be filtered or otherwise purified, may be reacted with a sulfide as such or fractionated in the manner described above. As was the case with the crude bottoms, a preferred mixture of ketones is that remaining on distilling off the components of the hydrolyzed mixture which boil below 140° C. (10 mm. Hg). This residue is referred to herein as "topped, crude, hydrolyzed, isophorone bottoms" and is generally similar to topped, crude, isophorone bottoms, it being essentially made up of unsaturated alicyclic ketones having at least 15 carbon atoms in the molecule.

Isophorone bottoms produced by condensation of acetone under the conditions here described, and whether hydrolyzed or not, include any and all unsaturated alicyclic ketones containing at least 12 and preferably 15 or more carbon atoms in the molecule, and having generally the chemical structural configuration of isophorone and its various condensation products.

Other alicyclic unsaturated ketones containing 12 or more carbon atoms and having a structure similar to that of the ketones comprising the isophorone bottoms, whether hydrolyzed or not, are prepared by the alkaline condensation of mesityl oxide. The latter compound (which may be prepared by condensing acetone into diacetone alcohol in the presence of soda lime and thereafter subjecting the alcohol to acid catalyzed dehydration) condenses in the presence of strong (e. g., 30 to 60%) caustic and at elevated temperatures and pressures to form, in the main, $C_{12}C_{18}O$, $C_{18}C_{26}O$, and higher molecular ketone units. The desired $C_{12}$ and higher ketones may be obtained from the mesityl oxide condensation product by topping the same (i. e., distilling off the lower boiling fractions) until a still head temperature of about 96° C. (4 mm. Hg) is reached. The residue (bottoms in the still) may then be used as such or it may be still further topped to a still head temperature of 160° C. (4 mm. Hg), at which point the main portion of the $C_{18}$ ketones begins to distill. The distillation may be carried still further, if desired, though a preferred practice is to employ the residue containing the $C_{18}$ and higher ketones for reaction with a sulfide to form the rubber additives of this invention.

The higher ketones described above, whether derived from isophorone bottoms or the mesityl oxide condensate, are cyclic products of an unsaturated character. They may, if desired, be saturated either in whole or in part by suitable hydrogen treatment, and the resulting hydrogenated ketones are also capable of reacting with sulfides of the type indicated above to form additives having the ability to increase the resistance of vulcanized rubbery polymer against atmospheric cracking.

Suitable higher ketones of the acyclic type may be produced by condensing acetone with compounds condensable therewith to form ketones containing 12 or more carbon atoms in the molecule. Thus, when acetone is condensed with isopropyl alcohol at elevated temperatures in the presence of an alumina catalyst or of one made up of copper on alumina, for example, there are produced di-isobutyl ketone and various higher ketones of the acyclic, branched chain, saturated variety. From the acetone-isopropyl alcohol condensate, bottoms made up of ketones containing 12 or more carbon atoms in the molecule are obtained by topping the mixture to a still head temperature of approximately 128° C. (50 mm. Hg), whereas the $C_{15}$ and $C_{18}$ ketones begin to distill at temperatures of approximately 164° C. (50 mm. Hg) and 155° C. (10 mm. Hg), respectively. A particularly desirable higher ketone material for reaction with sulfides to form the additive of this invention comprises the residue remaining on distilling off the $C_{15}$ and lower ketones from the acetone-ispropyl alcohol condensate, this desired residue having an average molecule weight of 310 and being referred to herein as "topped, crude, di-isobutyl ketone bottoms."

In forming the additives of this invention, a suitable sulfide is reacted with any of the higher ketones, or higher ketone-containing fractions described above, although certain of these fractions are preferred to others as has already been indicated. Among the sulfides, in turn, it is preferred to use a phosphorus sulfide rather than the ammonium hydrosulfide-hydrogen sulfide reactant. Phosphorus sulfides generally, including phosphorus pentasulfide, phosphorus heptasulfide, and/or phosphorus sesquisulfide, can be used in the production of such reaction products, the preparation being a relatively simple one requiring no special equipment, precautions or skill.

In the case of the phosphorus sulfides, the desired ketone-sulfide reaction products may be obtained by mixing the ketone with a phosphorus sulfide and thereafter maintaining these materials in reactive engagement in an inert atmosphere and at elevated temperatures for several hours. The desired reaction product is then extracted with a suitable solvent which may then be volatilized, leaving the product. The additives thus produced, which contain both sulfur and phosphorus, vary in color from amber to dark brown and in consistency from viscous liquids to brittle solids. Physically as well as chemically, these sulfide-ketone addition products differ widely from compounds of the thioketone variety.

To consider in greater detail the conditions under which the reaction between the higher ketone and a phosphorus sulfide is brought about, it may first be noted that the reactants should be combined in a phosphorus sulfide:ketone mole ratio which may vary from about 1:1 to about 1:8, a preferred range being from about 1:2 to about 1:4. The reaction temperature can be varied between about 130° C. and about 200° C., or higher, though it is preferably maintained between 150° C. and 170° C. during the major portion of the reaction interval. It is preferable to so control the initial or starting temperature that the first part of the reaction takes place at a temperature between about 60° C. and 80° C., for when the temperature rises rapidly to 100° C. or above, the reaction becomes unduly vigorous and various undesired products are formed. This initial, low temperature phase of the reaction need not be long-continued, it normally sufficing to keep the mixture at a temperature between 60° C. and 80° C. during the first ten or fifteen minutes. The reaction is preferably conducted in a substantially inert atmosphere, as under nitrogen or carbon dioxide, with the ketone and sulfide reactants being brought together either per se or dispersed in a suitable diluent. When the reaction is complete, and normal reaction periods vary from one or two to as much as 8 or 10 hours, the desired compound can be extracted with a suitable solvent, as a non-aromatic hydrocarbon having a boiling range of between 164° F. and 233° F., or an aviation gas stock boiling up to 190° F. and containing little (e. g., not more than 4%) aromatics.

The following examples ilustrate the preparation of various reaction products of higher ketones with phosphorus sufides which are well adapted for addition to rubbery polymer in order to increase the resistance of the vulcanized product against atmospheric cracking.

*Example I*

A mixture made up of 0.32 mole of cyclic, unsaturated ketones containing at least 15 carbon atoms in the molecule [obtained by topping crude isophorone bottoms until a still head temperature of 140° C. (10 mm. Hg) was reached] and 0.22 mole of phosphorus pentasulfide was stirred together and heated under an inert atmosphere of carbon dioxide. The mixture was initially maintained at a temperature between 60° C. and 80° C. for a period of several minutes, after which it was rapidly heated to 160° C. and there maintained for a period of five hours. At the end of this reaction period the desired reaction product was extracted with a non-aromatic hydrocarbon having a boiling range of between about 164° F. and 233° F. The resulting solution was then filtered and vaporized over a steam bath in a current of carbon dioxide, yielding a product which at room temperatures was a brown viscous liquid containing 17.4% sulfur and 5.7% phosphorus, the balance being made up of hydrogen, oxygen and carbon.

*Example II*

Other experiments were carried out under the same conditions as described in the foregoing Example I except for a variation in the mole ratio of ketone to sulfide. When this ratio was 2.85 to 1, the final product contained 13.8% sulfur and 1.3% phosphorus, while by using ketone/sulfide mole ratios of 6.4 to 1, 1.88 to 1, and 2 to 1, products were obtained which contained 7.7% sulfur and 0.82% phosphorus, 17.0% sulfur and 4.1% phosphorus, and 15.9% sulfur and 4.7% phosphorus, respectively.

*Example III*

A $C_{18}$ unsaturated ketone obtained from the alkaline condensation of mesityl oxide was reacted with phosphorus pentasulfide in varying proportions under the conditions described in Example I. With a ketone/sulfide mole ratio of 7 to 1, a dark brown, sticky, viscous mass was obtained containing 5.6% sulfur and 0.53% phosphorus. An asphalt-like mass containing 11.9% sulfur and 3% phosphorus resulted when the reaction was carried on using a ketone/sulfide mole ratio of 3.5 to 1. Lowering the ratio still further, to 2.3 to 1, was productive of a brittle solid containing 13.8% sulfur and 4.8% phosphorus, whereas with a mole ratio of 1.8 to 1 there was produced a similar solid which contained 14.2% sulfur and 4.1% phosphorus.

*Example IV*

A $C_{18}$ saturated ketone, obtained by the catalytic hydrogenation of the corresponding unsaturated ketone obtained by alkaline condensation of mesityl oxide, was mixed with phosphorus pentasulfide in the ratio of 3.5 moles of the ketone for each mole of sulfide. After working up the reaction product in the usual manner as described in Example I, there was obtained a dark red, viscous mass which contained 11.2% sulfur and 2.7% phosphorus.

*Example V*

In this operation 100 grams (about 0.54 mole) of a $C_{12}$ ketone obtained on the alumina catalyzed condensation of acetone and isopropyl alcohol to produce di-isobutyl ketone were mixed with 50 grams (0.22 mole) of phosphorus pentasulfide. On reacting this mixture and recovering the product in the manner described in Example I above, there was obtained a syrupy, orange colored liquid which was found to contain 23.7% sulfur and 5% phosphorus.

*Example VI*

This operation was conducted under the same conditions as described above in Example V except that here the ketone from the di-isobutyl ketone synthesis contained 15 carbon atoms in the molecule. The product in this case was a viscous, orange colored mass, barely flowing at room temperature, which contained 21.3% sulfur and 5.7% phosphorus.

Example VII

The ketone employed in this example represented the bottoms from the di-isobutyl ketone synthesis after removal of $C_{12}$ and $C_{15}$ ketones. The product obtained on reacting 100 grams of these topped bottoms with 50 grams of phosphorus pentasulfide in the manner described in detail in Example I was a brown viscous mass containing 19.2% sulfur and 5.1% phosphorus. In a companion operation, the amount of phosphorus pentasulfide was reduced to 37.5 grams and the temperature of the reaction was varied from 136° C. to 168° C. instead of being maintained at about 160° C. Here the product contained only 13.6% sulfur and 3% phosphorus.

To continue with the description of the invention, when the higher ketone is reacted with ammonium hydrosulfide-hydrogen sulfide, the preferred practice is to first introduce anhydrous ammonia into a suitable solvent until the solution is substantially saturated and thereafter to saturate the solution with hydrogen sulfide, thereby forming ammonium hydrosulfide and providing an excess of hydrogen sulfide. The higher ketone may then either be introduced into this solution or it may be added thereto as a solute portion in the same or a different solvent from that employed with the ammonia and hydrogen sulfide. In any event, the preferred practice is to again saturate the solution with hydrogen sulfide after the ketone has been introduced, at the same time displacing with hydrogen sulfide any air present in the reaction vessel. The relative amounts of hydrogen sulfide, ammonia (or ammonium hydrosulfide) and ketone to be employed may be varied within relatively wide limits. However, it is preferred that the solution contain from about .05 to 2 moles of ammonium hydrosulfide and from about 0.1 to 2.5 moles of hydrogen sulfide over and above that necessary to form ammonium hydrosulfide, for each mole of ketone which is present. The reaction formative of the ketone-sulfide product proceeds at room temperatures and pressures though it is greatly accelerated by heating, as from 75° C. to 150° C.

Any one or more of a variety of different solvents can be used to contain both the ketone and the ammonium hydrosulfide-hydrogen sulfide reactants. Suitable solvents for this purpose are the lower aliphatic alcohols such as ethanol, propanol, isopropanol, butanol, isobutanol, glycol, etc., as well as such other solvents as dioxane and the like. It is preferred to employ a lower aliphatic alcohol as a solvent, and particularly good results have been obtained when isopropyl alcohol is used for this purpose. The following examples will bring out in a clearer fashion the manner in which the reaction products of the type discussed in the foregoing paragraph may be prepared, such products being all well adapted for incorporation in rubbery polymer compositions to increase the resistance of the latter against atmospheric cracking when vulcanized.

Example VIII

Isopropyl alcohol (700 cc.) at room temperature and contained in a four liter, thick walled suction flask was saturated with dry ammonia, after which it was saturated with dry hydrogen sulfide. A solution of 238.5 grams of topped crude isophorone bottoms [crude isophorone bottoms topped to a still head temperature of 140° C. (10 mm. Hg)] in 350 cc. of isopropyl alcohol was then added and the resulting solution again saturated with dry hydrogen sulfide. The flask was then closed and allowed to stand for one week with infrequent shaking. Upon opening the flask a vacuum was discovered. The reaction mixture was filtered to remove impurities and the isopropyl alcohol was removed from the filtrate by vaporization. The residue was dissolved in 500 cc. of a non-aromatic hydrocarbon having a boiling range of between about 164° F. and 233° F., and the resulting solution was then washed with water. After removal of the solvent in a current of nitrogen gas on a steam bath, there was obtained a highly viscous, sticky mass which exhibited much less flow at room temperature than did the starting mixture. The product possessed a pleasant odor suggestive of crude molasses. On analysis, the product was found to contain 7.2% sulfur, 76.2% carbon, 9.6% hydrogen, 0.26% nitrogen and the balance oxygen. Its molecular weight was 352.

Example IX

In this operation 3200 cc. of isopropyl alcohol were first saturated with anhydrous ammonia and then with hydrogen sulfide. To the resulting solution were added 1000 grams of crude isophorone bottoms [topped to a still head temperature of 140° C. (10 mm. Hg)] dissolved in 1200 cc. of isopropyl alcohol, after which the solution was again saturated with hydrogen sulfide. The solution was then placed in a 12 liter vessel and the air therein diplaced by hydrogen sulfide, after which the vessel was kept closed for a period of one week with occasional shaking. In this case the reaction product, after extraction in the manner described in Example VIII, was found to contain 6.26% sulfur and approximately 0.1% to 0.2% nitrogen. The total acidity of the product was determined as 0.0052 equivalent per 100 gram.

Example X

This operation was conducted under the same conditions as described in Example VIII except that here the quantity of higher ketone added was 243.5 grams and the reaction period was increased from one week to one month. It was found that this increase in the time of reaction increased the sulfur content of the material from 7.2 to 8.3%, the relative proportions of the other constituent elements remaining substantially the same.

Example XI

An unsaturated ketone product derived from the alkaline condensation of mesityl oxide and containing 18 or more carbon atoms in the molecule, was reacted with ammonium hydrosulfide-hydrogen sulfide under conditions similar to those described in Example VIII, a comparison operation being also conducted with respect to a like ketone fraction following saturation thereof by a hydrogenation treatment. The sulfide reaction product in the case of the unsaturated ketone was found to contain 3.87% sulfur, whereas the sulfur content of the product obtained using the saturated ketone was 6.1%.

The foregoing experiments VIII through XI were conducted at room temperatures. If desired, the reaction interval may be greatly reduced by maintaining the reactants at elevated temperatures, e. g., above 75° C., and at either atmospheric, superatmospheric or subatmospheric pressures. This is borne out by the following example:

Example XII

A solution of 295 grams of topped, crude, isophorone bottoms in isopropyl alcohol, containing ammonium hydrosulfide and saturated with hydrogen sulfide, was placed in an autoclave under a hydrogen sulfide atmosphere and there maintained at a temperature between 96 and 101.5° C. for a period of 5½ hours. At the end of this period the reaction mixture was removed and the product recovered in the manner described in Example VIII. The product was found to contain 6.2% sulfur, 77.2% carbon, 9.6% hydrogen, 0.3% nitrogen and 6.5% oxygen, its molecular weight being determined as 356.

Example XIII

In this operation 700 cc. of isopropyl alcohol were first saturated with anhydrous ammonia and then with hydrogen sulfide. To the solution were added 310 grams of a ketone in 350 cc. of isopropyl alcohol, said ketone being the residue remaining after topping the bottoms from the diisobutyl ketone synthesis to remove the $C_{12}$ and $C_{15}$ ketones. The solution was then saturated with hydrogen sulfide and placed in a closed container from which all the air had been displaced by hydrogen sulfide, where it was allowed to remain for one week. The product, on being recovered in the manner indicated in Example VIII was found to be a dark brown liquid having a sulfur content of 1.8%.

To again continue with the description of the invention, having obtained the desired ketone-sulfide additive, the same is then added in either the liquid, solid, or solution form to the rubbery polymer along with the other desired compounding ingredients. The resulting mixture is then given the normal prevulcanization treatments, if any, after which it is vulcanized in the customary fashion. The amount of ketone-sulfide additive to be employed is susceptible of considerable variation depending both on the nature of this additive as well as on that of the rubbery polymer and the other compounding ingredients used. However, good protection against atmosphere cracking is afforded by incorporating from 0.2 to 10% of this additive, based on the weight of rubbery polymer used, and the preferred practice is to employ from 1 to 5% thereof. While smaller amounts than 0.2% afford some measure of protection, the use of such small amounts as this is not recommended. Further, the use of amounts larger than 10% is generally undesirable since there is no commensurate improvement as regards resistance against atmospheric cracking and at the same time there is danger of so diluting the mix as to modify its other physical properties. Within the limits here described, however, the additions of ketone-sulfide product have the desired anti-cracking effect and at the same time do not otherwise appreciably modify the physical or chemical properties of the final vulcanized product. It should be noted that these additive compounds are stable compositions not generally susceptible to decomposition as the vulcanized product is aged or exposed to abnormally deleterious environmental conditions, with the result that the protection afforded by the additive is long-lasting and the vulcanized article does not suffer undesirable color changes or otherwise deteriorate in quality due to breakdown of the ketone-sulfide ingredient.

Subject to the limitation described above, any one or more of the ketone-sulfide additives described herein may be incorporated to advantage with any organic, rubbery polymer capable of being vulcanized with sulfur. As was pointed out above, this class of compounds includes not only the various natural rubbers, though they, together with natural and synthetic rubber mixtures wherein the natural rubber predominates, constitute the preferred class of compounds with which to employ the ketone-sulfide additives, but also the various synthetic rubbers of the type which are vulcanizable with sulfur and are polymers of a conjugated diolefin compound.

The new vulcanizable combinations of this invention comprise mixtures, preferably intimate homogenous mixtures, of one or more of the above-identified ketone-sulfide additives together with one or more rubbery polymers of the type vulcanizable with sulfur. The mixture may be produced by any known method, including blending on a roll mill, in a scale mixer, in a Banbury mixer, by precipitation from a common solvent, or by dispersion in water and addition to rubber latex, followed, if desired, by coagulation.

In addition to the ketone-sulfide additive and rubbery polymer, the vulcanizable composition contains other additives of which one is necessarily a vulcanizing agent. Suitable agents of the character are sulfur, sulfur chloride, sulfur thiocyanate, thiuram polysulfides and other organic or inorganic polysulfides, organic and inorganic peroxides, halogen-containing compounds, and nitrogen-containing compounds such as the nitrobenzenes.

Vulcanization accelerators and accelerator-activators may be present, particularly when sulfur-containing compounds are ingredients of the compositions. Illustrative examples of accelerators are tetramethyl thiuram disulfide, zinc dibutyl dithiocarbamate, tetramethyl thiuram monosulfide, dipentamethylene-thiuram tetrasulfide, mercapto benzo thiazole, hexamethylene-tetramine, aldehyde-ammonia, diphenylguanidine, diphenylthiourea, benzo thiazyl disulfide, piperidinium pentamethylene - dithiocarbamate, di-o-tolylguanidine and lead dimethyldithiocarbamate. The metal oxides such as zinc oxide and lead oxides are frequently added as accelerator-activators.

Tackifying and plasticizing substances are also common adjuvants, suitable compounds of this nature being dibutyl phthalate, dioctyl phthalate, tricresyl phosphate, triacetin, tetralin, soft coal tar, "Cumar" resins, soft factice, wool grease, petroleum oils, pine tar, asphalt, stearic acid, lauric acid and waxes. Polyallyl esters of monobasic acids may also be employed.

One or more antioxidants may be present, one of the most common being phenyl beta-naphthylamine. Illustrative of other antioxidants are p-hydroxy diphenyl, hydroquinone, p-amino-phenol, p,p'-diaminodiphenylmethane, polyalkyl phenols, m-toluylenediamine, diphenylamine, o-ditolylamine, p - ditolylamine, phenyl - alpha-naphthylamine, phenyl-beta-naphthyl-p-nitroso amine, symmetrical di-beta-naphthyl-p-phenylene diamine, diphenyl-diaminoethane and 2,4-diamino-diphenylamine.

In many of the compositions it is also desirable to add carbon black, the latter material acting not only as a filler and stiffener, but also as an agent to increase the tensile strength and to impart a dark color to the product. The choice of carbon black type will depend upon many factors, principally the nature of the rubbery polymer and the purpose of the composition. Soft and hard channel black, thermal decomposition black and semi-reinforcing furnace black are common types. The properties of the compositions, including color, may also be modified with other pigments such as titanium dioxide.

Having compounded the rubbery polymer by mixing therewith the ketone-sulfide additive, vulcanizing agent, and other compounding ingredients of the type named above or otherwise employed in the art, the mix is vulcanized by treatment at elevated temperatures, preferably above 100° C., for periods varying from several minutes to one or more hours. Preferred vulcanizing treatments are those conducted at temperatures of from 125 to 175° C. for from 15 to 45 minutes. Aside from this, the upper limit of the vulcanizing temperature is ordinarily determined only by reason of the degradation or decomposition of the material, or by the volitility of one or more of its constituents.

Compositions can be produced in accordance with the invention which are capable of use for substantially all of the purposes for which other rubber-like compositions are employed. Examples which come readily to mind are automobile tires and tubes, floor tilings, balloon coverings, umbrellas, raincoats, table covers, shower curtains, garment bags, electrical insulation, friction tape, hose for the handling of aqueous substances and of petroleum products and paints, lining and exterior coating in self-sealing gasoline tanks, gaskets, belts, shoe soles and heels, aprons, gloves, sporting goods such as rubber balls, bathing suits and caps, and drug sundries.

The following examples illustrate the present invention in various of its embodiments:

*Example XIV*

In this operation, sheets of vulcanized rubber were prepared by blending on a roll mill 100 parts of natural rubber (pale crepe), 5 parts zinc oxide, 10 parts titanium dioxide, 1 part stearic acid, 2 parts sulfur and 1 part benzoyl thiazyl disulfide, together with 2 parts of a ketone-sulfide additive, the latter being omitted in the case of a "control" sheet. In one case the ketone-sulfide additive was the phosphorus pentasulfide-isophorone bottoms reaction product containing 15.9% sulfur and 4.7% phosphorus whose preparation was described above in Example II, whereas in the other case the additive was the ammonium hydrosulfide-hydrogen sulfide-topped, crude isophorone bottoms reaction product of Example IX. Samples of each of the resulting sheets were then vulcanized at 140° C. for periods of 30, 45 and 60 minutes. The vulcanized products were exposed to the atmosphere on the roof at Emeryville, California, for 60 days during the month of January, February and March, the exposure being conducted in accordance with A. S. T. M. method D-518-38T, in which a one inch by five inch looped strip of each sample was exposed at a 45 degree angle to the weather. In each case, the length of vulcanization time proved insignificant as a factor influencing atmospheric cracking.

In the "control" group of rubber strips all showed substantially the same results, with the surface being badly cracked at the end of 11 days and disintegrating at the end of the 60 day test. With the strips incorporating the phosphorus pentasulfide-isophorone bottoms additive a few fine cracks developed by the 18th day, and this was still the condition at the end of the 60 days. This is regarded as excellent protection against atmospheric cracking. In the case of strips containing the ammonia hydrosulfide-hydrogen sulfide-isophorone bottoms reaction product, cracking was still confined to a few fine cracks at the end of the 32nd day and was only moderate at the end of the 46th day. There was still no evidence of deterioration even at the end of the 60-day test period.

*Example XV*

In this operation, vulcanized rubber belts $\frac{1}{8}$ inch thick, $\frac{3}{8}$ inch wide and 3 inches in diameter were prepared using the same formula and method of compounding as described in Example XIV above. In order to test the resistance of these belts to atmospheric cracking under dynamic conditions, they were placed over a $2\frac{7}{8}$ inch revolving drum and a 1 inch drive shaft under slight tension. The mechanism was exposed to the atmosphere on the roof at Emeryville, California for a period of 21 days in the month of August, during which time the shafts were driven constantly.

In the case of the "control" belt containing no ketone-sulfide additive, a great many fine cracks developed very early, i. e., the 4th day. A belt incorporating 2 parts by weight of the phosphorous sulfide-isophorone bottoms additive was still uncracked at the end of the 18th day, when the belt accidentally climbed a ridge on the drive shaft and abraded, thereby ending the test. Another belt incorporating 2 parts of the phosphorous pentasulfide-diisobutyl ketone bottoms additive, prepared as described above in Example VII, was found to be free of cracks at the end of the 7th day and had developed only a few fine cracks by the 18th day, when the belt climbed the ridge, ending the test. Similar tests with belts containing 2 parts by weight of a conventional "anti-suncracking" wax (microcrystalline wax) showed that the wax hastened rather than retarded the failure of the belt, the cracks being markedly deeper in the belt containing the wax than in the unprotected control.

*Example XVI*

Vulcanized rubber belts were prepared and tested in the manner described in Example XV, though here the belts were compounded from a synthetic rubber (GR-S) instead of from natural rubber, the exact formula being GR-S 100 parts, Pelletex (carbon black) 40 parts, Dutrex-6 (compound having aromatic nucleus with attached unsaturated olefins) 10 parts, zinc oxide 5 parts, B-L-E powder (physical mixture containing 65% of a complex diaryl amine-ketone-aldehyde reaction product and 35% of N,N'-diphenyl-p-phenylenediamine) 1 part, Captax (2-mercaptobenzo thiazole) 1.5 parts, diphenyl guanidine 0.2 part, sulfur 2 parts, and (except in the case of the control) 2 parts of an anti-atmospheric cracking agent. In the case of those belts wherein the anti-atmospheric cracking agent was Heliozone (a microcrystalline wax) deep cracks were in evidence over the entire belt surface at the end of the second week of the test. However, those belts which contained 2 parts of the ketone-sulfide product whose preparation is described in Example II were still entirely free of cracks at the end of 30 days.

The parts and percentages expressed herein are on a weight basis unless otherwise indicated.

Molecular weights were determined by ebullioscopic measurement in benzene.

We claim as our invention:

1. The method of providing vulcanized rubbery polymers having improved resistance against atmospheric cracking which comprises mixing with a sulfur vulcanizable composition comprising a rubbery polymer of a conjugated diolefin, from about 0.02 to 10% by weight (based on the weight of rubber polymer present) of a reaction product of a higher ketone of the type which contains at least 12 carbon atoms in the molecule and has the ketonic carbonyl group as its only reactive group, with a sulfide selected from the group consisting of phosphorus sulfides, and thereafer vulcanizing the mixture.

2. The method of claim 1 wherein the higher ketone is a homocondensation product of acetone.

3. The method of claim 1 wherein the higher ketone is contained in the bottoms formed during the caustic-catalyzed condensation of acetone to isophorone.

4. The method of claim 1 wherein the higher ketone is a caustic-catalyzed condensation product of mesityl oxide.

5. The method of providing a vulcanized natural rubber material having an improved resistance against atmospheric cracking which comprises mixing with a vulcanizable natural rubber composition from about 0.02 to 10% by weight (based on the weight of rubber present) of a reaction product of phosphorus pentasulfide with a mixture of ketones comprising the bottoms from the caustic catalyzed condensation of acetone to isophorone topped to remove all ketones containing less than 12 carbon atoms in the molecule, and thereafter vulcanizing the mixture.

6. The method of claim 5 wherein the bottoms are topped until a still head temperature of 140° C. (10 mm. Hg) is reached.

7. The method of providing a vulcanized natural rubber material having an improved resistance against atmospheric cracking which comprises mixing with a vulcanizable natural rubber composition from about 0.02 to 10% by weight (based on the weight of rubber present) of a reaction product of phosphorus pentasulfide with a mixture of ketones comprising that portion of the bottoms formed during the condensation of mesityl oxide which contains at least 18 carbon atoms in the molecule, and thereafter vulcanizing the mixture.

8. A composition comprising a vulcanized rubbery polymer of a conjugated diolefin and containing from about 0.02 to 10% by weight (based on the weight of rubbery polymer present) of the reaction product of a higher ketone of the type which contains at least 12 carbon atoms in the molecule and has the ketonic carbonyl group as its only reactive group with a sulfide selected from the group consisting of the phosphorus sulfides.

9. A vulcanized natural rubber composition containing from about 0.02 to 10% by weight (based on the weight of rubber present) of the reaction product of phosphorus pentasulfide with topped, crude, isophorone bottoms.

10. A vulcanized natural rubber composition containing from about 0.02 to 10% by weight (based on the weight of rubber present) of the reaction product of phosphorus pentasulfide with bottoms obtained on the caustic catalyzed condensation of mesityl oxide and containing at least 18 carbon atoms in the molecule.

FRANK M. McMILLAN.
DAVID E. ADELSON.

REFERENCES CITED

The following references are of record in the file of this patent:

UNITED STATES PATENTS

| Number | Name | Date |
| --- | --- | --- |
| 2,296,363 | Messer | Sept. 22, 1942 |
| 2,383,494 | Moran | Aug. 28, 1945 |
| 2,437,985 | Winkler | Mar. 16, 1948 |
| 2,481,487 | Adelson | Sept. 13, 1949 |